United States Patent
Tam et al.

(10) Patent No.: US 7,656,885 B2
(45) Date of Patent: Feb. 2, 2010

(54) INTERMEDIARY CONTENT GATEWAY SYSTEM AND METHOD

(75) Inventors: Derek Hung Kit Tam, Reston, VA (US); Thilo Rusche, Arlington, VA (US); Connor C. Kyle, Ashburn, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 980 days.

(21) Appl. No.: 10/852,101

(22) Filed: May 25, 2004

(65) Prior Publication Data

US 2005/0201392 A1 Sep. 15, 2005

Related U.S. Application Data

(60) Provisional application No. 60/552,448, filed on Mar. 12, 2004.

(51) Int. Cl.
*H04L 12/28* (2006.01)
(52) U.S. Cl. .................... 370/401; 370/352
(58) Field of Classification Search .......... 709/217, 709/224, 203, 229, 230; 707/10, 104, 2; 705/1, 65; 370/352; 455/406
See application file for complete search history.

(56) References Cited

U.S. PATENT DOCUMENTS

| | | | |
|---|---|---|---|
| 5,351,235 A | 9/1994 | Lahtinen | |
| 5,621,727 A | 4/1997 | Vaudreuil | |
| 5,768,509 A | 6/1998 | Gunluk | |
| 5,887,249 A | 3/1999 | Schmid | |
| 5,894,478 A | 4/1999 | Barzegar et al. | |
| 6,208,870 B1 | 3/2001 | Lorello et al. | |
| 6,226,618 B1 * | 5/2001 | Downs et al. | 705/1 |
| 6,230,009 B1 | 5/2001 | Holmes et al. | |
| 6,240,293 B1 | 5/2001 | Koster | |
| 6,327,267 B1 | 12/2001 | Valentine et al. | |
| 6,366,663 B1 | 4/2002 | Bauer et al. | |
| 6,421,437 B1 | 7/2002 | Slutsman | |
| 6,480,710 B1 * | 11/2002 | Laybourn et al. | 455/406 |
| 6,535,746 B1 | 3/2003 | Yu et al. | |
| 6,560,226 B1 | 5/2003 | Torrey et al. | |
| 6,594,254 B1 | 7/2003 | Kelly | |
| 6,598,077 B2 * | 7/2003 | Primak et al. | 709/219 |
| 6,615,212 B1 * | 9/2003 | Dutta et al. | 707/10 |
| 6,658,260 B2 | 12/2003 | Knotts | |
| 6,675,219 B1 * | 1/2004 | Leppinen et al. | 709/230 |
| 6,687,846 B1 * | 2/2004 | Adrangi et al. | 714/4 |
| 6,721,748 B1 * | 4/2004 | Knight et al. | 707/10 |

(Continued)

FOREIGN PATENT DOCUMENTS

EP 0 777 394 A1 6/1997

(Continued)

*Primary Examiner*—Thong H Vu
(74) *Attorney, Agent, or Firm*—Edell, Shapiro & Finnan, LLC (57) ABSTRACT

A system for enabling exchange of content over a communications network is disclosed having a first category of users comprising wireless carriers and a second category of users comprising content providers. A content gateway platform is provided having a database for storage of content. The content providers supply content to the database for use by the wireless carriers and the content is ultimately offered to end-user customers of the wireless carriers.

19 Claims, 6 Drawing Sheets

U.S. PATENT DOCUMENTS

| | | | |
|---|---|---|---|
| 6,738,630 B2 | 5/2004 | Ashmore | |
| 6,772,267 B2 | 8/2004 | Thaler et al. | |
| 6,968,175 B2 * | 11/2005 | Raivisto et al. | 455/406 |
| 6,968,389 B1 * | 11/2005 | Menditto et al. | 709/233 |
| 7,010,303 B2 * | 3/2006 | Lewis et al. | 455/445 |
| 7,020,685 B1 * | 3/2006 | Chen et al. | 709/204 |
| 7,039,594 B1 | 5/2006 | Gersting | |
| 7,073,193 B2 * | 7/2006 | Marsh | 725/114 |
| 7,095,871 B2 * | 8/2006 | Jones et al. | 382/100 |
| 7,181,438 B1 * | 2/2007 | Szabo | 707/2 |
| 7,209,950 B2 * | 4/2007 | Bennett et al. | 709/206 |
| 7,324,473 B2 * | 1/2008 | Corneille et al. | 370/328 |
| 7,403,517 B2 * | 7/2008 | Westman | 370/352 |
| 7,403,788 B2 * | 7/2008 | Trioano et al. | 455/466 |
| 7,433,710 B2 * | 10/2008 | Bodnar et al. | 455/556.1 |
| 7,464,178 B2 * | 12/2008 | Corrigan et al. | 709/238 |
| 2001/0021915 A1 | 9/2001 | Cohen et al. | 705/14 |
| 2001/0029538 A1 | 10/2001 | Blockton et al. | |
| 2001/0056460 A1 | 12/2001 | Sahota et al. | |
| 2002/0013711 A1 * | 1/2002 | Ahuja et al. | 705/1 |
| 2002/0015403 A1 | 2/2002 | McConnell et al. | |
| 2002/0029189 A1 | 3/2002 | Titus et al. | |
| 2002/0107903 A1 * | 8/2002 | Richter et al. | 709/201 |
| 2002/0112014 A1 | 8/2002 | Bennett et al. | |
| 2002/0120537 A1 | 8/2002 | Morea et al. | |
| 2002/0152090 A1 * | 10/2002 | Kobayashi et al. | 705/1 |
| 2002/0152278 A1 * | 10/2002 | Pontenzone et al. | 709/217 |
| 2002/0157002 A1 * | 10/2002 | Messerges et al. | 713/155 |
| 2002/0167909 A1 | 11/2002 | Balazinski et al. | |
| 2003/0014483 A1 * | 1/2003 | Stevenson et al. | 709/203 |
| 2003/0033434 A1 | 2/2003 | Kavacheri et al. | |
| 2003/0036408 A1 * | 2/2003 | Johansson et al. | 455/560 |
| 2003/0083078 A1 | 5/2003 | Allison et al. | |
| 2003/0103607 A1 * | 6/2003 | Feakes | 379/88.17 |
| 2003/0110272 A1 * | 6/2003 | du Castel et al. | 709/229 |
| 2003/0115188 A1 * | 6/2003 | Srinivasa et al. | 707/3 |
| 2003/0118027 A1 | 6/2003 | Lee et al. | |
| 2003/0131100 A1 * | 7/2003 | Godon et al. | 709/224 |
| 2003/0161335 A1 * | 8/2003 | Fransdonk | 370/401 |
| 2003/0195811 A1 * | 10/2003 | Hayes et al. | 705/26 |
| 2003/0202521 A1 | 10/2003 | Havinis et al. | |
| 2004/0032856 A1 | 2/2004 | Sandstrom | |
| 2004/0193648 A1 * | 9/2004 | Lai et al. | 707/104.1 |
| 2004/0215718 A1 * | 10/2004 | Kazmi et al. | 709/203 |
| 2004/0224662 A1 | 11/2004 | O'Neil et al. | |
| 2004/0249768 A1 * | 12/2004 | Kontio et al. | 705/65 |
| 2005/0192871 A1 * | 9/2005 | Galuten et al. | 705/26 |
| 2005/0193103 A1 * | 9/2005 | Drabik | 709/221 |
| 2006/0074727 A1 * | 4/2006 | Briere | 705/8 |
| 2007/0006327 A1 * | 1/2007 | Lal et al. | 726/31 |

FOREIGN PATENT DOCUMENTS

| | | |
|---|---|---|
| EP | 0 959 600 A1 | 11/1999 |
| WO | WO 97/20442 | 6/1997 |
| WO | WO 97/36434 | 10/1997 |
| WO | WO 99/11078 | 3/1999 |
| WO | WO 99/33226 | 7/1999 |
| WO | WO 00/41533 | 1/2001 |
| WO | WO 02/25875 A1 | 3/2002 |

* cited by examiner

INTERMEDIARY CONTENT GATEWAY SYSTEM AND METHOD

This application claims the benefit of U.S. Provisional Application No. 60/552,448, filed Mar. 12, 2004, which is herein incorporated by reference in its entirety.

BACKGROUND

1. Field of the Invention

The present invention relates generally to a content gateway for use by generators and users of content. More specifically, the present invention relates to a content gateway for use in wireless communications that provides a market-place for service providers and content providers to do business and via which end users may access enhanced content on, e.g., wireless telephones.

2. Background of the Invention

In today's world of telecommunications, wireless service providers continue to add more and more content to their service offerings. The wireless communication industry, in its nascent stages, was merely about providing wireless voice communication between users. As the technology has advanced, today's phones and other wireless devices now offer, for example, games, customizable ring tones, text messaging services, the ability to capture and send images, advertising promotions, voting campaigns, internet service, graphics, video, and any number of new service offerings.

There are many wireless service providers or wireless carriers that provide these services via mobile communications devices to the public. The wireless carriers often provide their own content to be used by their customers, but there are also a growing number of independent content providers that develop and market content to be offered to the various wireless carriers. Because of the increasing number of entities in this market place, it is often difficult for independent content providers to identify, develop, and promote the most popular type of content. Also, because some content is device-specific, content providers may not have the kind of marketing information necessary to determine what technology they have already developed that may be worth translating for use on other devices or with other wireless carriers.

In addition to the marketing aspects, there are transactional costs associated with the current market place whereby individual wireless carriers must transact separately with each content provider to provide the content and determine how the providers will be compensated for the usage of the content. Accordingly, it would be desirable to provide improved systems and methods to promote the enhanced content supplied by disparate providers.

BRIEF SUMMARY OF THE INVENTION

The present invention aims to provide a consolidated marketplace for wireless content to aid in alleviating one or more of the above-described problems. The central point of this consolidated marketplace is referred to herein as a "content gateway." The content gateway comprises a database for storage of content provided by independent content providers as well as wireless carriers themselves. In addition to storing the content, the content gateway may allow for one or more of various other functions/services including, for example, billing and other accounting services, marketing services, transcoding services, administrative services, etc.

According to one aspect, the present invention relates to a system for enabling exchange of content over a communications network. The system is accessible by at least a first category of users and a second category of users. A content gateway platform is included comprising a database for storage of content, whereby the first category of users supplies content to the database for use by the second category of users. The content gateway platform further provides tracking services to track one or more aspects associated with accessing the content in the database by one or more users of either the first category or second category.

According to another aspect, a system for enabling exchange of content over a communications network is disclosed having a first category of users comprising wireless carriers and a second category of users comprising content providers. A content gateway platform is provided having a database for storage of content. The content providers supply content to the database for use by the wireless carriers and the content is ultimately offered to end-user customers of the wireless carriers.

BRIEF DESCRIPTION OF THE DRAWINGS

FIG. 6 is an exemplary graphical representation of data that could be presented to a user of the content gateway platform of FIG. 2.

DETAILED DESCRIPTION OF THE INVENTION

In one exemplary embodiment, a content gateway platform in accordance with the present invention and which will be described in more detail with respect to FIG. 2, leverages features and functionality that are provided by key core message processing, routing, and delivery infrastructure that can be provided by a wireless communication inter-carrier vendor. An illustrative example of such an inter-carrier vendor infrastructure may be found in co-pending U.S. application Ser. No. 10/426,662, filed May 1, 2003, entitled "System and Method for Interconnecting Heterogeneous Networks," the content of which is incorporated by reference herein in its entirety. Briefly, the inter-carrier vendor described in this application enables heterogeneous telecommunications systems to seamlessly exchange messages with one another.

The content gateway platform of the present invention may also, where appropriate, take advantage of message routing opportunities that exist through the use of a "universal short code" (USC). An illustrative example of a USC environment may be found in co-pending U.S. application Ser. No. 10/742,764, filed Dec. 23, 2003, entitled "Systems and Methods for a Universal Short Code Administration Facility," the content of which is incorporated by reference herein in its entirety. This application discloses how a single short code can be made operable across disparate telecommunications system providers.

At its most basic level, the content gateway (CG) platform may serve as a bridge between two key communities in a content world—content providers and content consumers. Examples of content providers include the ever-expanding numbers of creators, authors, packagers, etc., of content. Content consumers are exemplified by the numerous wireless carriers through which mobile subscribers (MSs), the ultimate consumers, or end users, of content, are reachable.

The CG platform, in one aspect, offers the members of each of the two communities an array of tools and services that support different activities that may be necessary or desirable during the content lifecycle. As one illustrative example, consider the hypothetical content value chain 100 shown in FIG. 1. The process could start with, for example, content origination at step 110, at which original content is created or a popular brand may be offered. At step 120, application development, a packaged offering is created that provides technical know-how in support of content owners. Next, at step 130, service provisioning, published application programming interfaces (APIs), developer programs, and support services (e.g., hosting and delivery) are considered. The process next moves on to step 140, Portal/Web provisioning, where content is offered to the end consumer.

Figure 1:
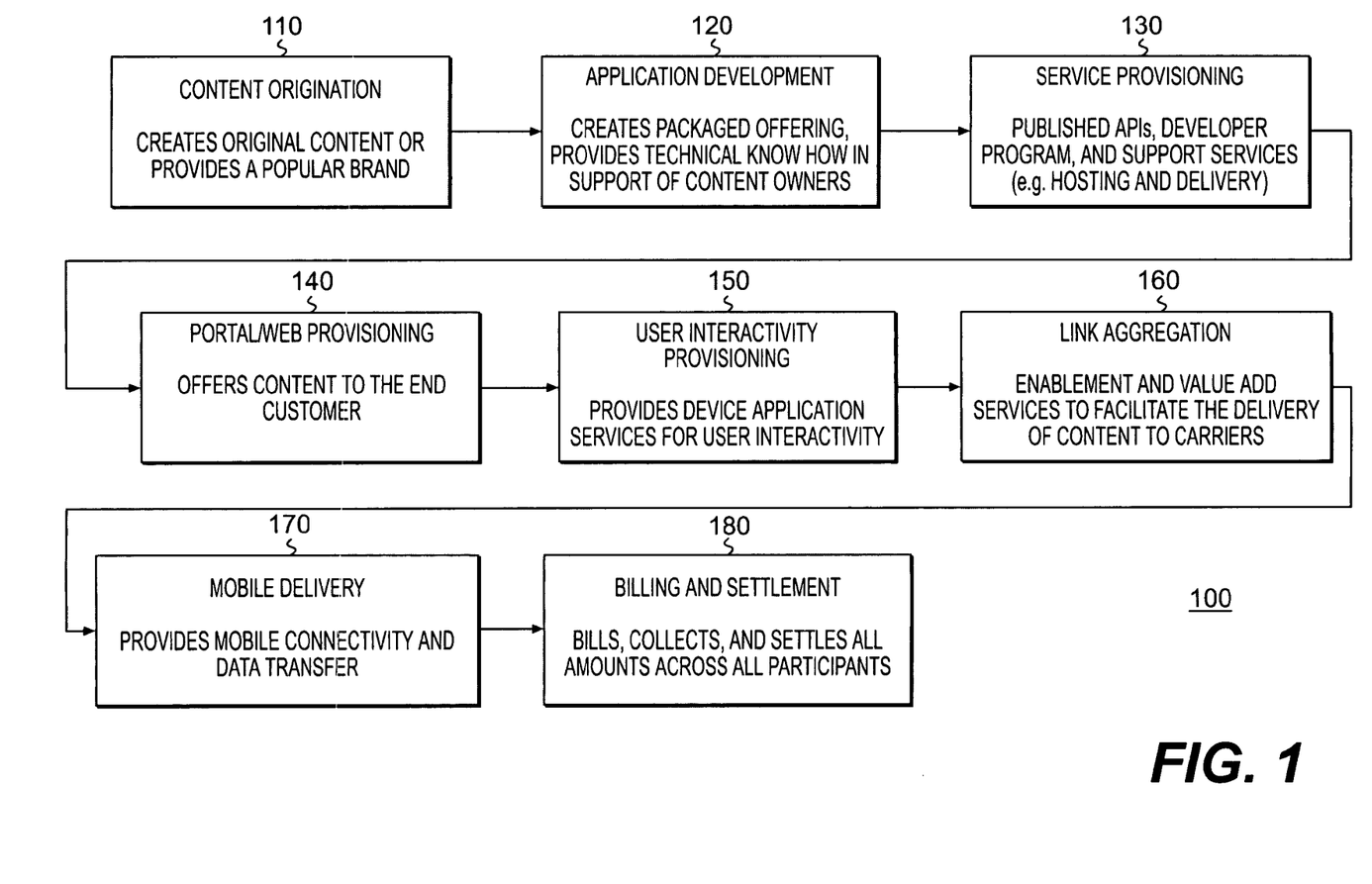
FIG. 1 is an exemplary content value chain in accordance with the present invention.

Next at step 150, user interactivity provisioning, device application services for user interactivity may be provided. At step 160, link aggregation, enablement and value added services may be created to facilitate the delivery of content to carriers. At step 170, mobile delivery, mobile connectivity and data transfer may be provided. Finally, at step 180, billing and settlement, bills may generated, collected, and all amounts may be settled across the various participants. As can easily be appreciated, the number of participants in this chain makes it difficult for any of the individual participants to effectively handle the data collection and reporting capabilities that are required to support a comprehensive billing and settlement service all the way up and down the chain.

Figure 2:
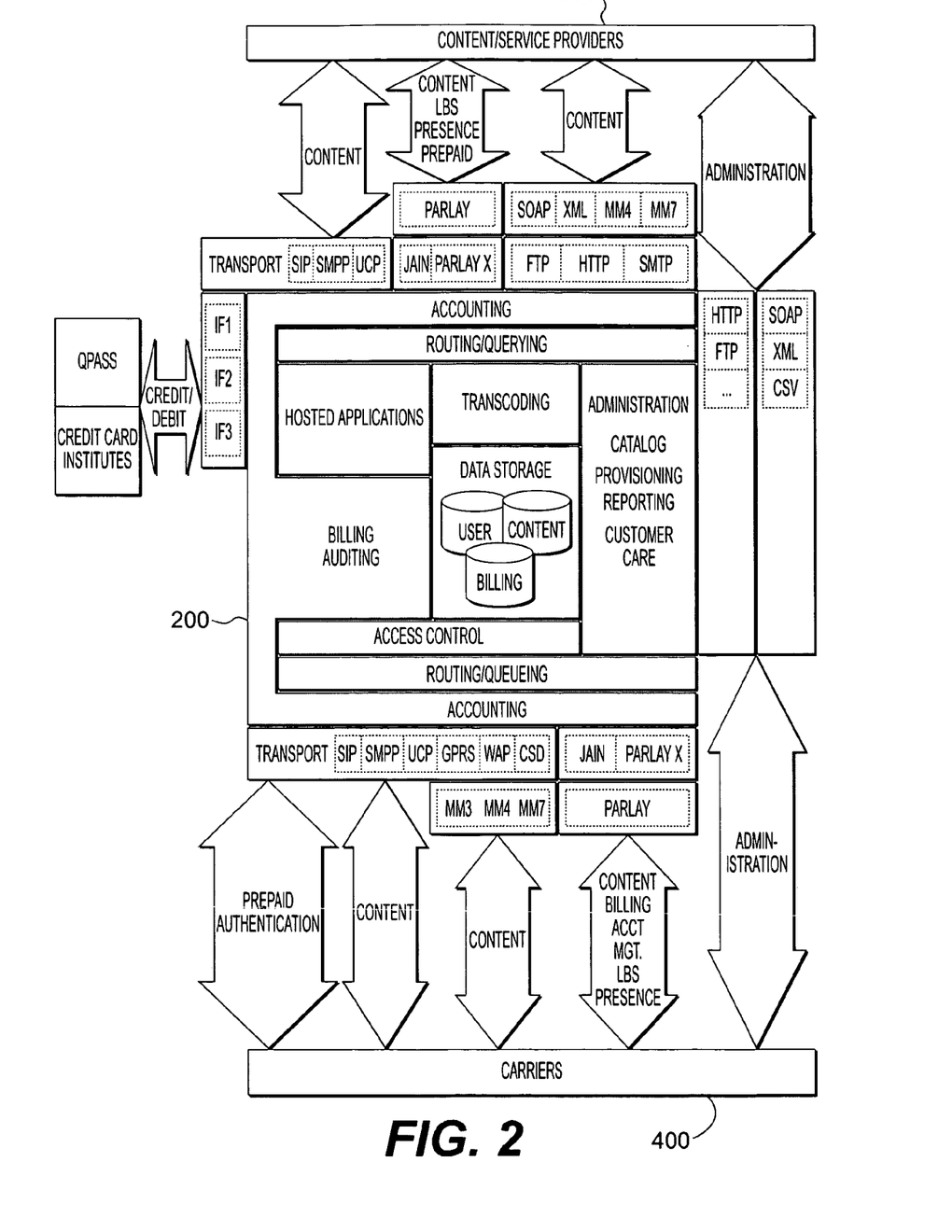
FIG. 2 is a schematic representation of a content gateway platform according to the present invention.

FIG. 2 depicts, in accordance with the present invention, a centralized marketplace for content, including content gateway (CG) platform 200, which alleviates many of the difficulties associated with individual participants working without any group synergies. CG platform 200 is intended to be exemplary only. Those skilled in the art will appreciate that this specific implementation can be modified as new content and delivery technologies emerge.

One key community associated with CG platform 200 encompasses the content producers/providers 300, that are depicted at the top of FIG. 2. A second community, content consumers or carriers 400, are depicted at the bottom of CG platform 200. CG platform 200, itself, resides logically, in the middle providing much of the features, function and services that make possible the management and delivery of content. CG platform 200 preferably includes a data storage facility capable of storing, for example, user information, content, and billing information. CG platform 200 also preferably allows for accounting functionality to be implemented for both providers 300 and carriers 400.

In addition, there are other services housed within CG platform 200, such as hosted applications, authentication, access control, routing/queuing, and auditing. CG platform 200 also provides administration services, such as, for example, a catalog, provisioning, reporting, and customer care. Those skilled in the field of software will appreciate that FIG. 2 represents a plurality of well-known applications, routing schemes and data types that have been aggregated in such a way as to provide the overall functionality of the CG platform 200 described herein.

Content providers 300 and carriers 400 each may interact with CG platform 200 to upload and/or download content, as well as to access any of the other services provided within the platform. As shown, CG platform 200 may support many different types of communication protocols to allow the various users to connect in substantially whatever fashion is most convenient. CG platform 200 may also be interconnected with credit/debit services to allow for easy payment options for the various services provided. These and other aspects are described in more detail below.

In accordance with the present invention, content producers 300 offer or submit content to CG platform 200 through one or more of the supported channels—e.g., the exchange of extensible markup language (XML) documents via simple mail transfer protocol (SMTP), the exchange of data streams over dedicated short message peer-to-peer (SMPP) connections, among others shown in FIG. 2. It should be apparent to those skilled in the art that channels not expressly depicted, and incorporating other exchange artifacts (e.g., data streams, etc.), and other communications protocols can also be employed in conjunction with CG platform 200.

As shown, content consumers 400 retrieve or "pull" content from CG platform 200 (e.g., in real-time in response to a mobile subscriber, in scheduled batches to refresh their Web-based portal interface, etc.) through one or more of the supported channels (similar to those described in relation to the communication between content providers 300 and the CG platform 200). Integral to CG platform 200 is a data storage subsystem for storing all of the content and other aspects of the system to allow it to operate.

A separate administrative channel supports administrative activities (e.g., definitional, management, etc.). These activities may also include, among other things, the creation and maintenance of the CG platform users. The CG platform also includes a flexible and extensible user model comprising at least one CG administrator with universal access to the entire platform as well as individual users, each with his own specific, assigned set of access rights and permissions. Each user of CG platform 200 may be assigned a login ID and password that are associated with the specific set of access rights and permissions. These rights and permissions may define the subject matter each individual may see within the platform as well as what such an individual may do within the platform.

In a preferred implementation, a CG administrator creates domains and defines subsets of the universe of content to which each domain has access. The CG administrator may also create a domain administrator within each domain. The domain administrator, in turn, may create and manage the individual CG users within his domain and may assign to those users (e.g., through an intermediate group construct) the necessary platform rights. An exemplary administration chart for assigning rights within CG platform 200 is shown in FIG. 3.

Figure 3:
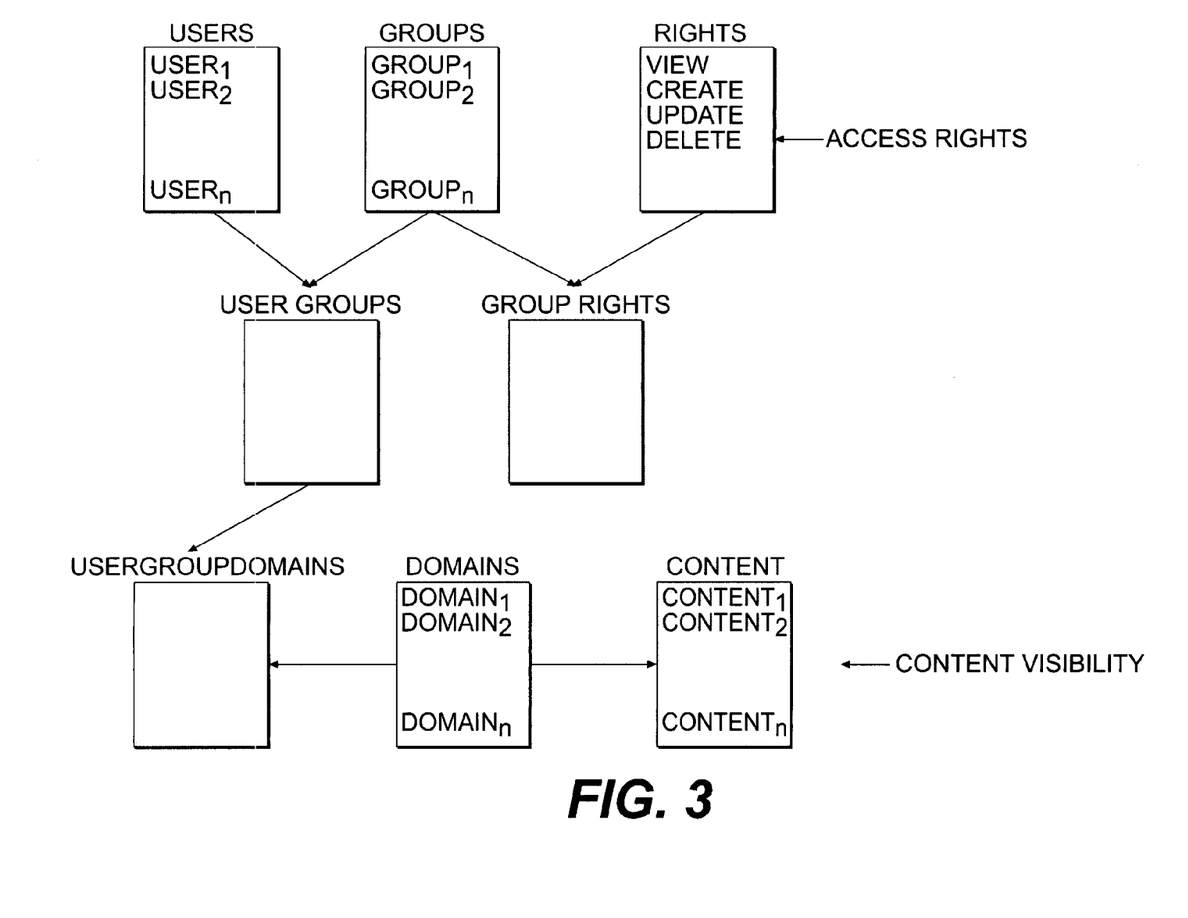
FIG. 3 is an exemplary schematic diagram showing allocation of access rights within a content gateway platform according to the present invention.

Along the top level of FIG. 3 are depicted Users, Groups, and Rights. The rights may include, for example, the ability to view, create, update, and delete. In the second level, the User Groups category stores information from the Groups and Users boxes to determine which users are in which group. The Group Rights box similarly meshes information from the Rights and Groups categories to assign various rights to the groups, which is eventually passed down to the individual users in the group.

Along the bottom row, the User Group Domains category assigns to various groups access to each of the domains. The Domains category is also linked to the Content category so that various content is available within each domain. In addition to providing the rights, an audit trail may be provided that preserves, among other things, the particulars (e.g., the date, time, and user ID) associated with each user's entry into and departure from the CG platform. The accessibility diagram of FIG. 3 is merely exemplary and one of skill in the art would understand that other manners of assigning rights and access may be implemented.

Figure 4:
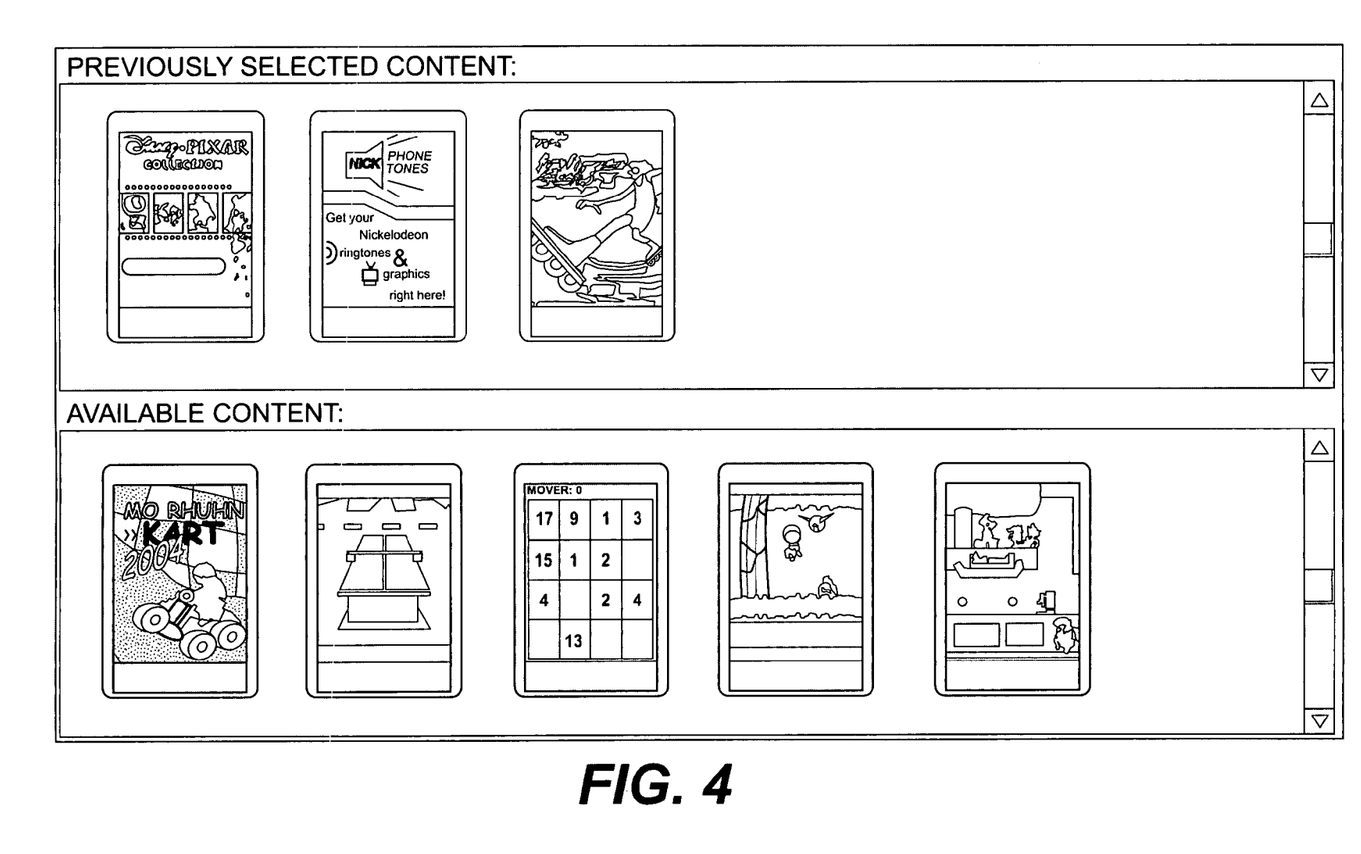
FIG. 4 depicts a display window showing how content could be displayed to a user of the content gateway platform of FIG. 2.

Once a user, which may be a carrier 400 or a content provider 300, logs into CG platform 200, he may be presented with an initial screen whose structure and layout (e.g. display artifacts and navigation menu options) are tailored to the user's specific access rights and permissions. The display may be populated based on, among other things, the content visibility rules that have been assigned to the particular user. FIG. 4 provides an exemplary display screen to display to a user. In a first window, icons representative of content a user has previously selected are displayed. The screen may also include, in a second window, icons representative of all content that is available to that particular user. These windows and their content may be modified to allow for the desired setup for each individual user.

Additionally, a comprehensive search facility may be provided, for example, to search the display regions, separately or combined, to filter the items shown, and to rapidly search for items. The search(es) may be conducted using a range of parameters or values, such as, for example, content type, date range, and content provider.

Once a user has selected a piece of content, the user may optionally preview that content by, for example, viewing an interactive audiovisual display (e.g., a set of animated screens in a sequenced slideshow). The preview may be unique to the piece of content and preferably captures the essence of the content to allow a user to make an informed decision as to purchasing the particular piece of content.

Content providers 300 may submit content to the platform via a variety of means. For example, content providers could submit content locally. In this manner, content providers could employ a comprehensive suite of content authoring, creation, packaging, and other tools that could be offered by CG platform 200. Accordingly, the content provider could locally generate content from scratch, directly on CG platform 200 itself. This could provide a major advantage to small content providers who do not have the resources to readily produce content from scratch and then also market that content.

Another way of providing content to the CG platform would be to do so remotely. In this manner, content providers 300 who produce their content, for example, within their own systems may use one or more of the supported channels, XML, SMTP, SMPP, etc. to upload the content to CG platform 200. This still provides advantages to content providers who may have the resources to develop their content, but are looking for, for example, a marketplace where content consumers "come to shop." For content providers in this category, CG platform 200 can virtually eliminate the need to shop their content around individually to each content consumer.

Once a piece of content is resident on the CG platform, it may begin working its way through a series of steps, such as, for example, review, approval, and publication. The specific steps through which a certain piece of content must traverse can be part of, and live under or within the context of, a flexible and dynamically configurable workflow sequence. A CG platform user that has been granted rights and access as described above may view, and if granted, alter an established workflow sequence, or even create a new sequence altogether.

A particular workflow sequence may include any number of individual steps. An exemplary process is described below, but one of skill in the art will appreciate that other workflow sequences may also be implemented within the context of the CG platform described herein. Initially a piece of content may be received and placed in a queue. Next the content may be analyzed and validated as to the data elements accompanying the content. These data elements may include, for example, content name, content type (e.g. MonoPhonic Ringtone, PolyPhonic Ringtone, Java™ Game, Brew™ Game), content size, mobile devices for which the content is appropriate, pricing information (e.g., suggested retail price, discount information), billing model (e.g., pre-paid, post-paid), and life expectancy. Once the content is received, CG platform 200 may issue a confirmation message (e.g., e-mail, SMS message) to inform the content provider that the content has been received.

Next, the workflow could proceed to the review process. During this process, the content may be examined, assessed, and either approved or rejected. The review process may optionally include adding an electronic watermark (e.g., "Sample") to the content. Also, the content may optionally be assigned a rating flag or descriptor. During each stage of the process, CG platform 200 may notify the content provider as to the content's status by sending out status messages to the content provider.

The final step in the workflow could be the selection process. At this step, a representative of a wireless carrier (i.e., content consumer 400) could select a piece of content, which would then be added to that carrier's content portfolio. Again, an optional message could be dispatched informing either the content provider or the carrier of this selection. As mentioned above, this workflow is merely exemplary and numerous other steps, such as, for example, publication, retirement, and upgrade, may be added to the workflow.

Figure 5:
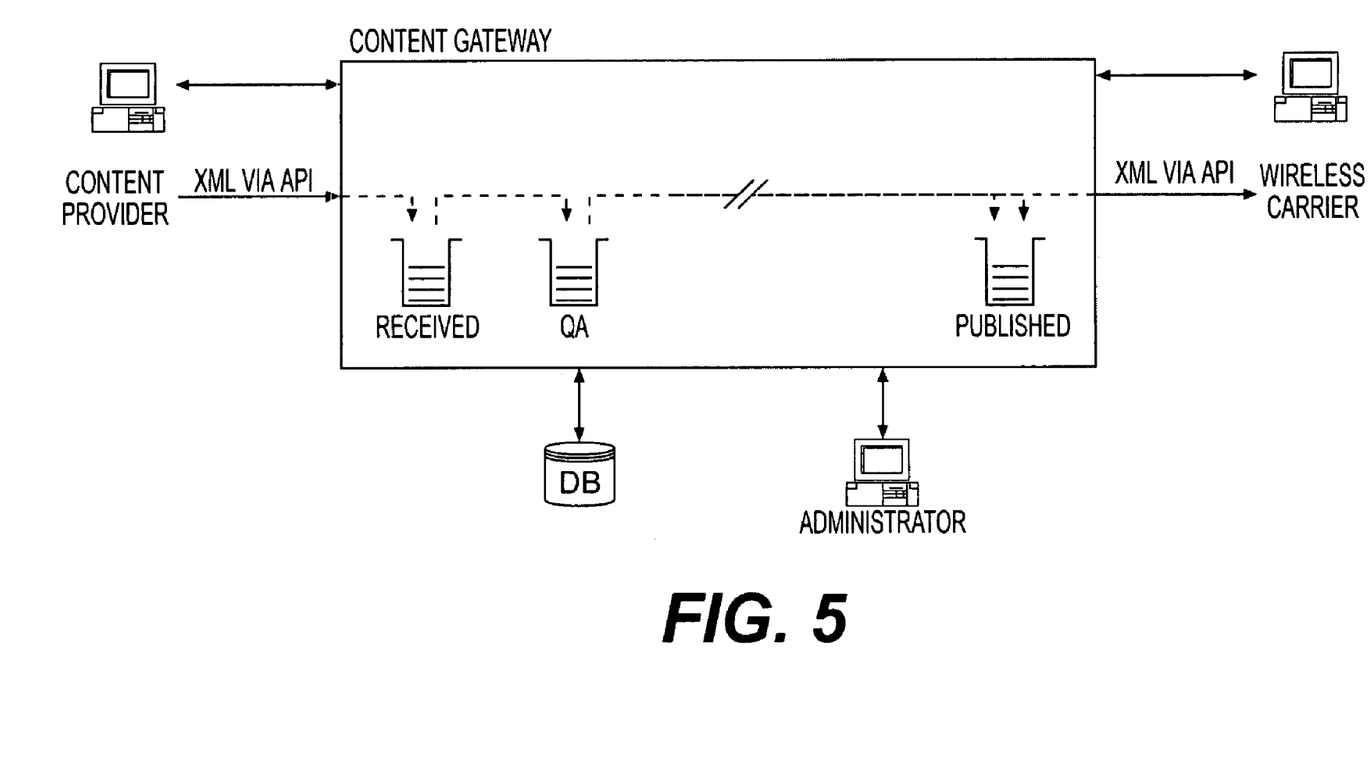
FIG. 5 is a simplified diagram of an exemplary audit trail utilizing the content gateway platform of FIG. 2.

As mentioned above, a comprehensive audit trail may also be maintained by CG platform 200 for each piece of content that is processed through the system. The audit trail may preserve, among other things, the particulars associated with each instance that a piece of content is accessed within the platform. FIG. 5 shows a simplified example of how such an audit trail may by maintained.

As shown in FIG. 5, a content provider submits a piece of content to CG platform 200 via an XML document through one of the CG platform's published APIs. The piece of content is dropped into a Received queue. The individual steps, for example, as described above, in the applicable workflow sequence may be applied and, ultimately, the piece of content is selected by a representative of a wireless carrier for inclusion in that wireless carrier's content portfolio.

Once a piece of content has been selected by a wireless carrier for inclusion in its portfolio, that piece of content is eligible for distribution through the CG platform's workflow-driven Intelligent Inventory Distribution (IID) facility. The IID may support one or more distribution mechanisms.

Two examples of these distributions mechanisms are real-time distribution and batch distribution. In real-time distribution, for example, a piece of content that is hosted on CG platform 200 may be retrieved by a wireless carrier for delivery to a mobile subscriber in response to a request from the mobile subscriber. In batch distribution on a scheduled basis, a wireless carrier may retrieve one or more pieces of content from the CG platform to refresh the wireless carrier's Web-based content interface. This content might be, for example, content it offers to any of its mobile subscribers who elect to purchase a standard content package offered by the wireless carrier.

During a distribution operation, a number of activities may be performed, including, for example, examination, invocation, and generation. During examination, entries on a dynamically configurable Black List and White list may be examined in order to filter and, if appropriate, eliminate unwanted distribution. Invocation may comprise invoking a rating engine on CG platform 200 to develop a cost associated with the selected distribution event. Generation may involve the generation of one or more content detail records for capturing some or all of the details of the particular content distribution event. Other activities may also be included that will also facilitate, for example, rapid and dynamic inclusion of new distribution activities within the IID.

Another preferred aspect of CG platform 200 is the capability to achieve comprehensive billing and settlement. In support of this service, CG platform 200 preferably has established communication channels to various external entities, including, but not limited to, credit card processors and wireless carrier billing systems. The particulars of each communication channel may be abstracted away through one or more interface layers. Accordingly, additional communication channels (e.g., in support of some new external entity) may quickly and easily be added to the CG platform.

The billing function preferably allows for application of a range of dynamically configurable parameters to determine the cost of an event (e.g., downloading a piece of content). For example, different combinations of units of measure (e.g., transactions, bytes, messages), pricing models, the application of credit limits, currency conversions, taxes, and application of coupons or discounts may be effectuated. During settlement, funds are allocated and distributed to the proper parties. For example, settlement may allow for the distribution of funds among all of the different entities in the hypothetical content value chain described in FIG. 1.

These settlement and billing facilities can greatly reduce costs of doing business for content providers because they can be automatic. If content providers take advantage of this aspect of the present invention, it may be possible that the providers' only task would essentially be the creation of the content. All of the other aspects may be taken care of by CG platform 200 and provider 300 can essentially be assured easy receipt of funds for the use of its content.

Another function that may be provided by CG platform 200 is that of comprehensive and easily extensible reporting capabilities. Through the reporting facility, a suitably-authorized CG platform user may select from a range of tabular and graphic presentations in support of a range of activities, including, but not limited to, monitoring, customer care, and fraud detection.

Monitoring may allow for a CG platform user to monitor, for example, the interest in a particular piece of content, the revenue that has been generated from the downloading of a particular piece of content, and the relative popularity of a wireless carrier's specific content portfolio. Any or all of these aspects may be utilized by CG platform users to maximize their efforts. For example, a wireless carrier can monitor its portfolio and see what content is popular or not so it can determine whether to discontinue certain content and potentially save money. It may also decide to add content similar to what it finds to be popular.

On the content provider side, the developer can see what is popular and use that information, for example, to focus efforts on porting applications from one mobile device to other mobile devices to allow it to take advantage of a particular application's popularity. Conversely, it can see what is not popular and either work to enhance that content or cease any further development.

As can be readily appreciated, one advantage of the present invention is when users, providers, and consumers are linked together in one large marketplace, it is possible to provide data not readily available if all parties are separately contracting and operating in their individual capacities.

Another benefit is improved customer care. CG platform 200 can allow for investigation and resolution of problems as reported by customers. Through the billing and settlement facility discussed above, the possible issuance of credit amounts could be more easily assessed (e.g., in response to a complaint that a particular downloaded game did not work properly).

The sheer volume of data may also allow for more enhanced fraud detection. Suspicious patterns may be more easily identified and subsequently explored. Such patterns may not even be ascertainable within the volume any one user could perceive within his/her own system. Besides the above-described advantages, many more should be readily apparent to those of skill in the art.

One example of a display that could be made available to users of CG platform 200 is depicted in FIG. 6. The left-hand side of the display provides date information, the topside lists the time of day, and the far right-hand side provides a running total of traffic accumulation by day. In addition to displaying the amount of hits for a given piece of content, which may represent how many times a particular application has been downloaded, the graph in FIG. 6 may be color coded with, for example, "hot" (e.g., red) and "cool" (e.g., blue) colors to visually display the popularity of an application.

Such information could be useful to both carriers 400 and content providers 300 as described above. Carriers 400 could use the data displayed in FIG. 6, for example, to see what content is popular and therefore determine whether to add more of that same type of content or possibly to add more content from the provider of that particular piece of content. On the other hand, providers 300 could use the information, for example, to also determine popular content and to make the decision to create more similar content or to port the popular content to other wireless devices not currently supported. In the converse, carriers 400 and providers 300 could make similar decisions to phase out unpopular content.

The above-described color-coding, could include, for example, using "hot" colors, such as, for example, reds, oranges, and yellows to show high usage and gradually fading into shades of blue and/or to represent lower usage. The specific parameters need not be limited to those shown in FIG. 6 and could be customized to include other parameters such as, for example, event type and date range, among others. These display parameters may be presented to the user in a drop-down menu, for example, to provide for easy customization of the information to be displayed.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for enabling exchange of content over a communications network, comprising:
a content gateway platform comprising a database for storage of content, the content being received from a content provider, the content gateway being in communication with a wireless carrier that serves mobile subscribers who cause the wireless carrier to pull content from the content gateway platform in real-time in response to a given one of the mobile subscribers;
the content gateway platform providing tracking services to track one or more aspects associated with accessing the content in the database, the content gateway further configured to validate data indicating for which mobile devices the content is appropriate to account for content that is mobile device-specific, wherein the data is received from the content provider along with the content.

2. The system of claim 1, wherein the content gateway platform provides marketing information to the content provider and to the wireless carrier.

3. The system of claim 2, wherein the marketing information comprises information related to popularity of a particular piece of content.

4. The system of claim 2, wherein the marketing information is displayed graphically.

5. The system of claim 1, wherein the content gateway platform provides billing service.

6. The system of claim 1, wherein the content gateway platform provides settlement service.

7. The system of claim 1, wherein the content gateway platform provides audit service.

8. The system of claim 1, wherein the content gateway platform allocates access rights to users of the content gateway platform.

9. The system of claim 8, wherein the access rights comprise at least one of viewing rights, creation rights, updating rights, and deletion rights.

10. The system of claim 8, wherein the users are divided into groups and assigned allocation rights according to the groups.

11. The system of claim 1, wherein content is developed within the content gateway platform for storage in the database.

12. The system of claim 1, wherein content is developed outside of the content gateway platform and communicated to the content gateway for storage in the database via one or more communications channels.

13. The system of claim 12, wherein the one or more communications channels comprises at least one of SMTP or SMPP.

14. The system of claim 1, wherein the content gateway platform transmits messages to the content provider and the wireless carrier to update status of content within the content gateway platform.

15. The system of claim 1, wherein the content gateway platform provides fraud detection service.

16. The system of claim 1, wherein the content comprises at least one of ring-tones, games, images, voting initiatives, or video.

17. The system of claim 1, wherein the content gateway platform is administered by an entity separate from the content provider and the wireless carrier.

18. A system for enabling exchange of content over a communications network, comprising:
a content gateway platform comprising a database for storage of content the content gateway platform in communication with a content provider that supplies the content and a wireless carrier that passes the content to mobile subscribers of the wireless carrier, the mobile subscribers causing the wireless carrier to pull content form the content gateway platform in real-time in response to the mobile subscribers;
the content gateway platform receiving, along with the content, pricing information for the content, a billing model for the content, data indicating for which mobile devices the content is appropriate to account for content that is mobile device-specific, and a life expectancy of the content.

19. The system of claim 18, wherein the content gateway platform provides information regarding the number of times a selected piece of content has been downloaded to both the content provider and the wireless carrier.

* * * * *